United States Patent

Paul

[15] 3,675,018
[45] July 4, 1972

[54] SEMICONDUCTOR TYPE RADIATION DETECTOR

[72] Inventor: Bernt Paul, Erlangen, Germany

[73] Assignee: Siemens Aktiengesellschaft, Berlin and Munich, Germany

[22] Filed: Dec. 3, 1970

[21] Appl. No.: 94,640

[30] Foreign Application Priority Data

Dec. 9, 1969    Germany ...................... P 19 61 576.0

[52] U.S. Cl. .................... 250/83.3 R, 250/83 R, 250/83.3 H
[51] Int. Cl. ........................................................ G01j 5/20
[58] Field of Search ................ 250/83.3 H, 83.3 HP, 83.3 R, 250/83 R

[56] References Cited

UNITED STATES PATENTS 2,936,373   5/1960   Welker et al. ...................... 250/83.3 H
2,189,122   2/1940   Andrews ........................... 250/83.3 H
3,122,642   2/1964   Hitchcock ......................... 250/83.3 HP

*Primary Examiner*—Archie R. Borchelt
*Attorney*—Curt M. Avery, Arthur E. Wilfond, Herbert L. Lerner and Daniel J. Tick

[57] ABSTRACT

An apparatus for detecting radiation emanating from a source movable along a path has an elongated radiation-sensitive electronic semiconductor of a first crystalline phase. The semiconductor is positionable substantially parallel to the path. Inclusions of a second crystalline phase are contained in the semiconductor and have an electrical conductivity higher than the first phase. The inclusions are orientated substantially perpendicular to the current flow in the semiconductor response to the radiation. Two magnetic structures are disposed one behind the other laterally of the semiconductor along its longitudinal dimension and have respective magnetic fields which penetrate the semiconductor in mutually opposite directions.

3 Claims, 6 Drawing Figures

SEMICONDUCTOR TYPE RADIATION DETECTOR

My invention relates to an apparatus for detecting radiation from a source movable along a path. The apparatus is equipped with the radiation sensitive electronic semiconductor member. Such direction detectors can be applied to determine the location of active radiation sources for example, temperature radiators and passive radiators which reflect received infrared radiation. The direction detectors have become significant in areas which include medical diagnosis and research as well as for industrial purposes, for example, in infrared follower control systems especially for the loop control in rolling mill works.

Morten and King have described an infrared position detector having a plurality of individual infrared detectors in "Infrared Physics," 1968, vol. 8, pages 9 to 14. In this position detector, the infrared detectors are disposed in a line mutually adjacent to each other. A great number of such lines form the detector surface. The individual detectors are scanned with a frequency of about 250,000 image spots per second. The sum of the individual detectors, for example 10,000 in number, can be scanned in one twenty-fifth second. This apparatus is therefore suitable for infrared television transmission. However, this apparatus performs its function with a relatively large technological effort and investment in electronic parts. It further has the disadvantage that the resolving power in line direction is limited by the smallest possible separation of the individual detectors from each other, this amount being approximately 100 $\mu$m.

For different application areas, for example, the loop control of light-section rolling mills, it is simply required to obtain the registration of a positional deviation of the radiating object in a linear dimension. An arrangement for solving this task contains a rotating polygon mirror which reflects the impinging radiation onto a radiation sensitive electronic component. A concentrated scanning ray passes across a given viewing region in unison with the frequency determined by the rotation of the mirror and so directs an infrared ray entering the region onto the detector. By means of each polygon mirror, each spot of viewing region is scanned approximately 100 times per second. Should a gliding member of rolling material be located in the viewing range, the radiation received is illuminated as soon as the scanning ray reaches the edge of the material being rolled. The impinging radiation produces an electrical impulse that is converted and amplified and via a full wave rectifier sent to a receiving element, for example the control electrode of a thyristor.

The known radiation detector has a lead sulfide semiconductor body whose sensitivity region is known not to extend substantially beyond a wave length of 3 $\mu$m. The area of application is thereby correspondingly limited and in this connection, only radiators having a temperature above 200° C can be detected. It is therefore unworkable for radiators in the region of room temperature. The polygon mirror of this arrangement must be adjusted very precisely. In addition, the arrangement requires a continuous maintenance because of mechanically moving parts.

It is an object of my invention to provide a radiation detector which is reduced in cost compared to the known optoelectronic arrangements.

It is another object of my invention to provide a radiation detector having improved operational reliability and an expanded area of application.

The invention is based on the knowledge that an infrared detector can be used as a photo-thermomagnetic position detector when it is equipped to have an antisymmetrical characteristic. Such an infrared detector is known from the journal "Solid State Electronics," May, 1968. This known detector is based on the optically induced Ettinghausen-Nernst Effect and is therefore referred to in abbreviated designation as an OEN-Detector The operation of this detector is based on the use of the temperature gradient developed in the semiconductor body penetrated by a magnetic field in a direction opposite to the radiation direction. The semiconductor body penetrated by a transverse magnetic field delivers an electric voltage perpendicular to the temperature gradient and perpendicular to the magnetic field. This electrical voltage is suitable as an index of radiation.

The semiconductor contains inclusions having a second crystalline phase of better electrically conducting material. According to German Pat. No. 1,214,807 the semiconductor body can be made of indium-antinomide (InSb) with inclusions of nickel antinomide. According to U.S. Pat. No. 3,442,823 compounds of type $CB^V$ are suitable for inclusions with $A^{III}B^V$ semiconductor in which the C is an element from the group Fe, Co, Ni, Cr, and Mn, and $B^V$ is an element of Group V of the Periodic Table of Elements. Suitable inclusions can, for example, consist of FeSb, FeAs, CrSb and CrAs as well as MnSb. In addition, vanadium-gallium $V_2Ga_5$ or gallium-vanadium-antimonide $GaV_3Sb_5$ can be used.

The invention relates to apparatus for detecting radiation emanating from a source movable along a path. According to a feature of the invention, an elongated crystalline semiconductor body of a first phase is positionable to extend substantially parallel to the path. The semiconductor body has inclusions of a second crystalline phase which have a higher electrical conductivity than the first phase semiconductor. These inclusions are orientated in the first crystalline phase semiconductor body substantially perpendicular to the current flow in the latter and are preferably perpendicular to the plane irradiated by the radiation source. The semiconductor body is provided with magnetic structures having respective magnetic fields which penetrate the semiconductor in mutually opposite directions. The magnetic fields run perpendicular to the longitudinal dimension of the semiconductor body and therefore perpendicular to the measured deviation or departure of the received radiation.

With regard to the manufacture and application of a semiconductor whose crystalline body is not crystallographically homogeneous but contains, integrally embedded in the semiconductor substance proper, a multitude of electrically or magnetically different inclusions mutually spaced and generally aligned to form a spacial matrix within the crystal, reference may be had to U.S. Pat. No. 3,226,225.

The arrangement according to the invention requires no external voltage source and its response is very short. With rays having a wave length of $\lambda > 7$ $\mu$m the response time is approximately $10^{-4}$ seconds and with wave lengths $\lambda < 7$ $\mu$m the response time is only $10^{-5}$ seconds. The arrangement is suitable for detecting rays from radiating objects having a temperature down to about $-40°C$.

The apparatus is so adjusted that the rays given off from a zero position of the radiating object are received in a region of a semiconductor body that is located between two magnetic fields arranged one behind the other. In this position the output signal of the apparatus is close to zero. According to the departure of the radiating object from the null position toward the right or left, the apparatus gives a positive or negative output respectively and registers thereby the positional departure of the radiating object.

The invention will now be described with reference to the drawings, wherein.

Figure 1:
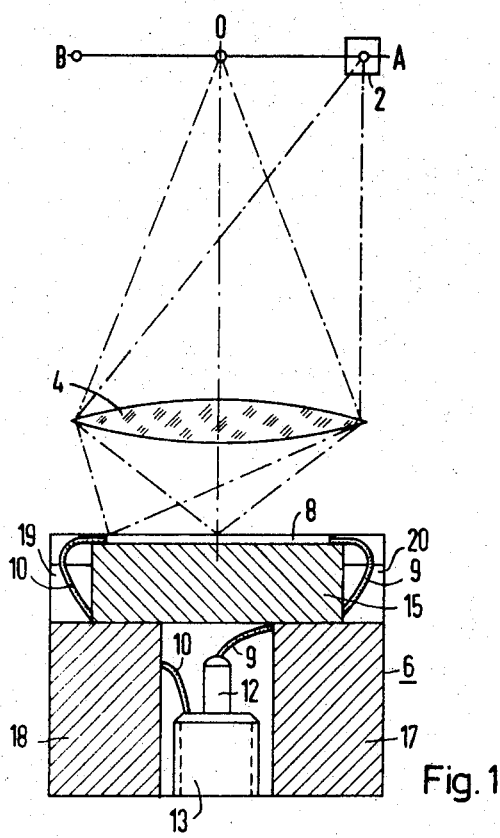
FIG. 1 is a schematic diagram showing the apparatus of the invention together with a path over which the source of radiation can travel.

Referring to FIG. 1, a radiating object is illustrated showing how its radiation is directed to the apparatus according to the invention 6 via an infrared objective 4. The objective 4 can also be a mirror optical. The radiation detector 6 contains a semiconductor body 8 that is elongated in the direction of the possible deviation of the received radiation. The semiconductor body 8 is provided with respective electrical connectors 9 and 10 and its ends. The semiconductor body 8 comprises a semiconductor material, for example, indium antimonide InSb and inclusions of a second crystalline phase, for example, nickel antimonide NiSb. These inclusions are arranged perpendicular to the direction of the electric field and perpendicular to the field direction of the respective permanent magnets 17 and 18. The permanent magnets 17 and 18 are disposed laterally of the longitudinal dimension of the semiconductor body and are arranged behind one another in the direction of the deviation of the received radiation to be measured. The semiconductor body 8 is arranged adjacent to the pole shoes of the magnets designated by N and S and is electrically insulated with respect thereto. The field direction of the magnets is selected so that a ray traveling along a path deviating toward the right to the end position A from the path corresponding to the 0 position of the radiating object 2 will cause an output signal of one polarity to be generated and will cause an output signal of a polarity opposite to said one polarity to be generated as soon as the radiating object 2 moves from the 0 position in the opposite direction to the end position B.

The semiconductor body 8 is secured to the carrier 15, for example the carrier can be glued or cemented thereon. The carrier 15 can be made, for example of a good heat conducting metal such as copper. The semiconductor body is electrically isolated with respect to the carrier 15. The magnetic fields are generated by ferrite magnets 17 and 18, respectively. Ferrite magnets 17 and 18 are provided with two pole shoes 19, 20 and 21, 22 respectively. The electrical connecting leads 9 and 10 are connected respectively to output leads 12 and 13. Conductors 12 and 13 are electrically isolated from one another and can be configured as an electrical coaxial conductor.

Figure 2:
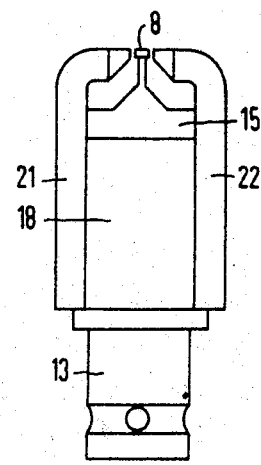
FIG. 2 is an elevation view in schematic representation of the apparatus of FIG. 1.

FIG. 2 illustrates the semiconductor body 8 with its carrier 15 as well as the magnet 18 with its pole shoes 21 and 22. The coaxial output leads 12 and 13 are directed through the base of the detector apparatus 6 and are preferably constructed as a plug connection or screw connection to facilitate its connection to a supporting structure not illustrated in the figure. Such plug connections are known under the designation BNC plugs. The entire arrangement can be included within a protective enclosure not illustrated in the figure.

Figure 3:
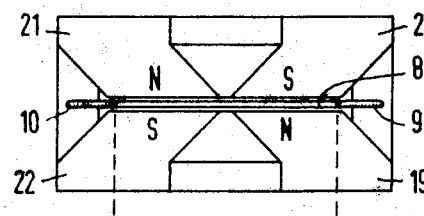
FIG. 3 is a plan view of the detection apparatus illustrated in FIG. 1.

The pole legs 19 to 22 shown in FIG. 3 can be dimensioned so that only a very small dead space is provided at the center portion of the semiconductor body 8. The ends of the pole legs 19 to 22 can be separated somewhat in the longitudinal direction of the semiconductor body 8 so that a somewhat larger portion of the semiconductor body is not penetrated by the field of the magnets 17 and 18. In this way, an enlarged insensitive region at both sides of the null or 0 position is obtained.

Figure 4:
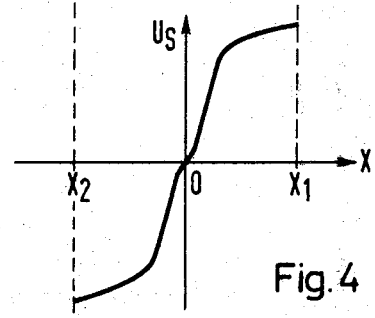
FIG. 4 illustrates the transfer function or characteristic of the apparatus of FIG. 1.

Should the radiating object 2 move from the null position toward the right in the direction of position A, the impinging ray correspondingly moves away from the position between the four pole shoes to the left. As soon as the ray covers a definite region of the semiconductor body between the two pole shoes 21 and 22, there is obtained according to FIG. 4 a negative output signal $U_s$ from the arrangement whose intensity increases with increasing deviation of the received radiation from the symmetry point. The maximum value of the output signal $U_s$ can become smaller as soon as a part of the received radiation travels over the end position $x_2$, that is, beyond the end of the semiconductor body 8. This small reduction on the output signal is not illustrated in the figure. Should the radiation object 2 move from the starting position 0 in the opposite direction toward the end position B, an output signal of positive sign is obtained according to the transfer function or characteristic illustrated in FIG. 4. At the end position B of the radiation source 2, the ray impinging upon the detector 6 reaches its end position $x_1$. According to the movement of the radiation source 2 toward the left or right, the apparatus according to the invention changes its output signal and registers thereby the change in location of the point from which the radiation emanates.

Figure 5:
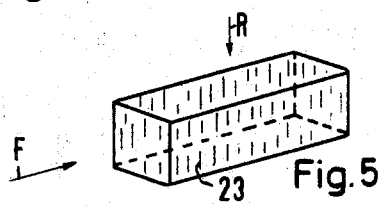
FIG. 5 illustrates a semiconductor used with an apparatus of the type shown in FIG. 1 with inclusions orientated substantially perpendicular to the current flow.

FIG. 5 illustrates an embodiment wherein the inclusions 23 are orientated perpendicular to the current flowing through the semiconductor body.

Figure 6:
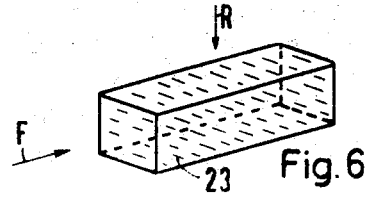
FIG. 6 illustrates a semiconductor used with an apparatus of the type shown in FIG. 1 with the inclusions orientated in the preferred manner, namely, substantially perpendicular to the flow of current and perpendicular to the plane of the semiconductor irradiated by the radiating object.

In FIG. 6 there is illustrated the semiconductor body of the apparatus illustrated in FIG. 1 showing the inclusions 23 disposed in their preferred orientation perpendicular to the plane of the semiconductor body at which the radiation R from the radiating object impinges. Also shown is how the inclusions are perpendicular to the current flow in the semiconductor body represented by reference character $F_1$.

While the invention has been described by means of a specific example, I do not wish to be limited thereto, for obvious modifications would occur to those skilled in the art without departing from the spirit and scope of the invention.

I claim:

1. Apparatus for detecting radiation emanating from a source movable along a path, comprising an elongated radiation sensitive electric semiconductor composed of a first crystalline phase and inclusions of a second crystalline phase having higher electrical conductivity than said first phase, said semiconductor being positionable to extend substantially parallel to said path with said inclusions being orientated substantially perpendicularly to the current flow in said semiconductor in response to said radiation, and two magnetic structures disposed one behind the other laterally of said semiconductor along said longitudinal dimension, said magnetic structures having respective magnetic fields which penetrate said semiconductor in mutually opposite directions.

2. In the apparatus of claim 1, wherein said radiation is directed toward a plane of said semiconductor, said inclusions being orientated in said semiconductor perpendicularly to said plane.

3. In the apparatus of claim 1, said semiconductor being made of indium antimonide (InSb), and said inclusions being made of nickel antimonide (NiSb).

* * * * *